(12) United States Patent
Einecke et al.

(10) Patent No.: US 11,778,941 B2
(45) Date of Patent: Oct. 10, 2023

(54) SYSTEM COMPRISING AN AUTONOMOUS MOBILE DEVICE AND A BASE STATION COMMUNICATING VIA A BOUNDARY WIRE

(71) Applicant: HONDA RESEARCH INSTITUTE EUROPE GMBH, Offenbach/Main (DE)

(72) Inventors: Nils Einecke, Offenbach (DE); Sven Rebhan, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 617 days.

(21) Appl. No.: 16/697,413

(22) Filed: Nov. 27, 2019

(65) Prior Publication Data

US 2020/0221633 A1 Jul. 16, 2020

(30) Foreign Application Priority Data

Jan. 15, 2019 (EP) ...................... 19151832

(51) Int. Cl.
*A01D 34/00* (2006.01)
*G05D 1/02* (2020.01)

(52) U.S. Cl.
CPC ......... *A01D 34/008* (2013.01); *G05D 1/0219* (2013.01); *G05D 1/0225* (2013.01); *G05D 1/0265* (2013.01); *G05D 2201/0208* (2013.01)

(58) Field of Classification Search
CPC .. A01D 34/008; G05D 1/0219; G05D 1/0225; G05D 1/0265; G05D 2201/0208; G08C 17/02
See application file for complete search history.

(56) References Cited

U.S. PATENT DOCUMENTS

| 8,392,044 B2* | 3/2013 | Thompson | B60L 15/20 318/587 |
| 2004/0111196 A1* | 6/2004 | Dean | G05D 1/027 701/23 |

(Continued)

FOREIGN PATENT DOCUMENTS

| EP | 2 413 215 A2 | 2/2012 |
| EP | 2551739 A1 | 1/2013 |

(Continued)

OTHER PUBLICATIONS

Jul. 30, 2019 Extended Search Report issued in European Patent Application No. 19151832.3.

*Primary Examiner* — Jeff A Burke
*Assistant Examiner* — Sihar A Karwan
(74) *Attorney, Agent, or Firm* — SQUIRE PATTON BOGGS (US) LLP

(57) ABSTRACT

A system comprising an autonomous mobile device and a base station connected to a boundary wire is configured to transmit information from the base station to the autonomous mobile device. The base station is configured to generate a radio signal to be emitted by the boundary wire, wherein the autonomous mobile device is configured to autonomously drive within a working area based on the signal emitted by the boundary wire. The base station on the other hand is configured to encode data and/or commands into the radio signal which is then emitted by the boundary wire. The autonomous mobile device receive the emitted radio signal and is configured to decode the encoded data and/or commands in order to retrieve the original information.

14 Claims, 3 Drawing Sheets

(56) References Cited

U.S. PATENT DOCUMENTS

| | | | |
|---|---|---|---|
| 2016/0109241 A1 | 4/2016 | Eguchi et al. | |
| 2016/0291595 A1* | 10/2016 | Halloran | G05D 1/0227 |
| 2018/0213717 A1* | 8/2018 | Jägenstedt | G05D 1/021 |
| 2018/0352734 A1* | 12/2018 | Matt | A01D 34/008 |
| 2018/0370376 A1* | 12/2018 | Liu | B60L 53/36 |
| 2019/0215179 A1* | 7/2019 | Mannfeld | H04L 41/082 |

FOREIGN PATENT DOCUMENTS

| | | |
|---|---|---|
| WO | 2016102142 A1 | 6/2016 |
| WO | 2018199830 A1 | 11/2018 |

* cited by examiner

SYSTEM COMPRISING AN AUTONOMOUS MOBILE DEVICE AND A BASE STATION COMMUNICATING VIA A BOUNDARY WIRE

BACKGROUND

Field

The invention relates to a system comprising an autonomous mobile device and a base station that is connected to a boundary wire, wherein the base station is configured to generate a radio signal to be emitted by the boundary wire and the autonomous device is configured to autonomously move within a working area based on the signal emitted by the boundary wire.

Description of the Related Art

Autonomous mobile devices have become more and more popular over the last years. Such autonomous mobile devices are capable of executing a working task thereby assisting a person to fulfill such working task. One example of such an autonomous mobile device is an autonomous lawnmower, but of course, there are a plurality of different autonomous mobile devices useful to assist us in our daily life. Further examples are vacuum cleaners, garden robots, storage robots. It is in particular known for outdoor robots that the working area where the autonomous mobile device shall operate is indicated by a so-called boundary wire. The boundary wire is connected to a signal source, usually provided in the base station, which is also equipped with charging equipment for recharging the battery of the autonomous mobile device. The boundary wire emits an electromagnetic signal that is generated in such base station. During operation, the autonomous mobile device usually drives around in the working area randomly and thus approaches the boundary wire, where the electromagnetic field emitted by the boundary wire is sensed by sensors that are mounted on the autonomous mobile device. From the signal strength the autonomous mobile device can derive its distance to the boundary wire. Consequently, when the signal strength exceeds a certain value, the autonomous mobile device recognizes that it reached the edge of its working area. The mobile device will perform a turning maneuver in order to return more to the center of the working area.

Such a basic system is described in U.S. Pat. No. 8,392,044 B2. The distance between a boundary wire and an autonomous lawnmower is estimated by means of signal correlation. Such a basic system is sufficient in order to fulfill simple tasks like mowing a lawn, cleaning a certain area or the like, because for such a simple operation it is only necessary to ensure that the autonomous mobile device drives around within the limits of its working area.

However, it is desirable to further improve the system, such that the functionality of the system can be improved or operation is more flexible. It is for example necessary, that the autonomous mobile device returns in due time to its base station, before state of charge of the battery is too low to return to the base station. Returning to its base station must be done autonomously by the autonomous mobile device of course. Thus, it is necessary that the autonomous mobile device can find the base station by itself. Since both ends of the boundary wire are connected to the base station, the easiest way to find the base station is to drive along the boundary wire. One approach for following the boundary wire in order to return to the base station is described in EP 2 413 215 A2. This publication describes a wire follow function for robotic lawnmowers for returning to the base station. The focus of the publication lies on varying distances between the autonomous mobile device and the wire. Using such varying distances successfully avoid damages to the lawn due to tracks that would necessarily develop when the autonomous mobile device would always follow the boundary wire with the same distance to return to its base station.

Although the known systems of course are able to fulfill basic working tasks, they lack flexibility. These systems operate with a fixed set of parameters that are set in the autonomous mobile device when the system is installed. Adjusting operating times, mowing height or other parameters of operation of such an autonomous mobile device is cumbersome because it is required to input these parameters into the mobile device. However, it would be desirable if the autonomous mobile devices could be operated adaptively with respect to changes in environmental conditions or in response to the current needs of its operator. But adjusting the settings of the autonomous mobile device in response to changes in the environment, like for example children playing on the lawn, is practically impossible, if it cannot be performed from remote. On the other side, most of such autonomous mobile devices are consumer products and thus production cost plays an important role. Adding new functionality consequently must not increase costs significantly. An operator can be a human, but it may also be another system like a smart home, smart camera or any other artificial intelligent system.

SUMMARY

Thus, it is an object of the present invention to improve the adaptivity of a system comprising an autonomous mobile device using a boundary wire to limit its working area, while at the same time keeping an eye on the product costs.

The subject is achieved by the system comprising an autonomous mobile device and a base station according to claim 1. The system according to the present invention comprises the autonomous mobile device and a base station, wherein the base station is connected to a boundary wire. The base station is configured to generate a radio signal and to transfer the radio signal to the boundary wire, which emits this radio signal. The autonomous mobile device drives within a working area that is indicated by the boundary wire being installed at the outer edge of the working area. Apart from its basic function of generating a radio signal for indicating the outer limits of the working area, and according to the invention, the base station does not only generate this basic radio signal but the base station is configured to encode data and/or commands on the radio signal. Thus, the boundary wire is not only used in order to indicate the edge of the working area to the autonomous mobile device but also to provide additional information to the autonomous mobile device. The autonomous mobile device is configured to decode the encoded data and/or commands, thereby receiving the original information for further processing.

Thus, according to the present invention a communication channel between the base station and the autonomous mobile device is established. It is possible to use the radio signal which is necessary anyway to define the autonomous mobile device's working area to additionally transmit information from the base station to the autonomous mobile device. The radio signal generated by the base station is used as a carrier for the additional information. The information that is transmitted from the base station to the autonomous mobile device can be any kind of data and in particular commands to control the operation of the autonomous mobile device. When the unidirectional communication channel is used to transmit commands to the autonomous mobile device, the operation of the autonomous mobile device may directly be influenced. On the other side, additional information may be transmitted to the autonomous mobile device, for example in order to influence its configuration. Such additional information may be operating times of the like, which are set by the operator of the system. Of course, such information may also enable the system to automatically adapt to the information. For example, based on weather information, the autonomous mobile device may automatically return to the base station even before it starts to rain.

Generally, the data which is submitted from the base station to the autonomous mobile device is not limited. Any kind of data may be encoded into the radio signal. Of course, it is desirable if the communication follows a defined protocol which can be known protocols or proprietary protocols. One big advantage of the inventive system is that radio signal generation is necessary in the base station anyway. The additional costs are low, since only an opportunity must be provided to modulate the radio signal that is generated in the base station according to the information that shall be transmitted to the autonomous mobile device. Since the base station is used for encoding the additional information (data and/or commands) into the radio signal, it is also possible to use the same source of information, namely the base station, for providing information to a plurality of devices.

Preferred embodiments and aspects are defined in the dependent claims.

According to one preferred embodiment, the frequency of the radio signal on the boundary wire is adapted to the length of the wire. By adapting the frequency of the radio signal to the length of the wire, the transmission quality for transmitting information to the autonomous mobile device does not depend on the length of the boundary wire. Consequently, the system may be used for working areas of arbitrary size and shape.

Further, according to another preferred embodiment, the transmission power output of the radio signal is adapted according to a maximum receiving distance of the autonomous mobile device and/or according to legal norms and regulations concerning allowed signal power. When the transmission power output is adapted to according to the maximum possible receiving distance between the autonomous mobile device and the boundary wire, the mobile device will be capable to receive information which is transmitted by emitting a modulated radio signal at any position within its working area. In case that the working area is so large, and legal norms or other limiting factors for the signal power prohibit coverage of the entire working area, it is possible to repeat transmission of the information for example in regular time intervals so that the autonomous mobile device may receive the respective information as soon as drives back into the coverage area.

According to another advantageous embodiment, the autonomous mobile device is configured to directly convert decode commands into control commands. Operation of the autonomous mobile device is based on such control commands. Thus, the control commands are suitable at least for controlling one of driving direction, driving speed and operation of a working tool of the autonomous mobile device. When commands are transmitted from the base station to the autonomous mobile device, it is possible to directly influence operation, driving direction and driving speed due to the needs of an operator. In such a case it is for example possible, that, using an operator's terminal, the operator instructs the autonomous mobile device to return to the base station, to stop the current working task, move to a certain position, move to a zone within the working area or adjust some working parameters like mowing height. Respective commands could be: "return to base", "stop mowing", "stop moving", "move to coordinate", "move to a zone", "move to Wi-Fi range of house network" and "adjust mowing height". Dependent on its current position and the received command, the autonomous mobile device will then convert the command into control commands, that internally control the motors and/or actuators such that the command can be executed starting from the current position of the autonomous mobile device. It is evident, that for some of these commands predefined zones must exist, which are, for example, stored in a memory of the autonomous mobile device. Such zones can for example be defined when the system is installed.

Transmission of commands from the base station to the autonomous mobile device enables a kind of remote control, such that the operator of the autonomous mobile device may immediately react on changed conditions in the working area of the autonomous mobile device. For example in case of an autonomous lawnmower, when the operator suddenly recognizes that there are children playing in the garden, the operator may immediately command the autonomous mobile device to stop its operation and return to the base station or the like. Such commands will be converted by the autonomous mobile device directly into control commands based on which driving and operation of the autonomous mobile device are performed.

It is not only possible to transmit commands to the autonomous mobile device that directly influence the current behavior of the autonomous mobile device, but also other information in form of data which can be further processed by the autonomous mobile device. Such other information is transmitted using data that is encoded by the base station to be transmitted via the boundary wire and decoded by the autonomous mobile device. From the decoded data, the mobile device may set parameters for future operation or automatically adapt its kind operation. Thus, contrary to the commands that directly instruct the autonomous mobile device how to operate immediately in response to the command thereby overruling the regular operation of the autonomous mobile device, the autonomous mobile device may be given additional information from which parameters may be derived that are used during future operation or based on which kind operation can be adapted. Such additional information may for example regard working times, navigation points, weather information, device configuration, map data or software updates.

Providing the autonomous mobile device with such additional information makes it easy to adapt the future operation of the autonomous mobile device to changing environmental conditions or changing needs of its operator. For example, transmitting such additional information enables the system to automatically react on that weather forecast, like for example rain. Contrary to current systems, which may have a rain sensor that causes the device to return to the base station, submitting a weather forecast to the autonomous mobile device can be used to return the autonomous mobile device to the base station even before it starts raining.

Although it is evident that one prominent example for an autonomous mobile device of the system according to the present invention is an autonomous lawnmower and explanations given herein are referred to such autonomous lawnmower, other autonomous mobile devices could be vacuum cleaners, other gardening robots or storage robots. The only requirement is that a boundary wire is used to delimit the working area of the robot where the autonomous mobile device operates, the boundary wire emitting a radio signal into which data and/or commands can be encoded. Since these boundary wires are usually used in outdoor applications rather than indoor applications, such outdoor systems are typical for implementing the present invention. It is preferred, that the protocol which is used for submitting information from the base station to the autonomous mobile device implements at least one of: a checksum, a hash value, a sender ID, a receiver ID or data packet length.

Preferred protocols for the present invention are: User Datagram Protocol (UDP), Trivial File Transfer Protocol (TFTP), Broadcast Trivial File Transfer Protocol (BTFTP), Saratoga Protocol or Licklider Transmission Protocol (LTP).

According to another preferred aspect, the communication between the base station and the autonomous mobile device is bidirectional. This is achieved by configuring the autonomous mobile device to inject a signal into the boundary wire for establishing a communication back channel. Such a back channel significantly improves the flexibility of the entire system, because using such back channel makes it possible to send an acknowledgment of received commands or data by the autonomous mobile device, but also to transmit status information regarding the current operation state of the autonomous mobile device. The autonomous mobile device could for example send back an acknowledgment each time it is requested to confirm safe receipt of transmitted information, but also to indicate, for example after a certain time interval elapsed from the last communication between the base station at the autonomous mobile device, that it is still properly operating. Further, exceptional situations might be communicated back from the autonomous mobile device to the base station which could then be forwarded to the operator of the system to keep him informed. One exemplary situation can be that the autonomous mobile device is being stuck.

In a further preferred embodiment there is not only one autonomous mobile device included in the system, but a plurality of autonomous mobile devices, all operated in the same working environment and thus using the same boundary wire to indicate the outer limits of the working environment. This plurality of autonomous mobile devices works cooperatively in the same working area. In such a case it is desirable that the individual autonomous mobile devices can communicate with each other. Using the back channel function, it is possible that one mobile device submits information to one, a plurality or all of the other autonomous mobile devices. It is of course particularly preferred that each of the autonomous mobile devices is associated with a unique address so that commands can address individual devices. This unique address can then also be used for the communication between the autonomous mobile devices and it is even possible that one of the mobile devices sends commands to the other autonomous mobile devices. The set of commands that can be used in the communication between the autonomous mobile devices may be the same or different from the commands that can be used by the operator of the system. Of course, each of the autonomous mobile devices may use an individually customized set of commands. Communication that takes place between a plurality of autonomous mobile devices, all operating in the same working area, enables the autonomous mobile devices to organize their operation. It is for example possible, that a plurality of autonomous lawnmowers cooperatively mow a common working area in order to reduce their working time. If on the other side a plurality of autonomous mobile devices have to share the same working area but have to fulfill different working tasks, the autonomous mobile devices may negotiate schedules or work zones in order to avoid any conflict. The system thus is preferably configured to determine operating times and/or working areas for each of the autonomous mobile devices of the plurality of autonomous mobile devices. In a preferred embodiment, the autonomous mobile devices negotiate schedules and/or working areas, using their individual communication with the base station only in order to exchange information with at least one other autonomous mobile device. Alternatively, the determination of the schedules and/or the working areas could be made by only one of the autonomous mobile devices acting as a master that sets schedules and/or working areas for at least one other autonomous mobile device. Finally, it is also possible that the determination of the schedules and/or working areas is performed by a central unit. This could be the base station or a computing unit having the computational capacity to collect and process information received from the autonomous mobile devices. Once the schedules and/or working areas for one or more of the autonomous mobile devices are determined, information on the schedule and/or working area is transmitted from the base station or computing unit, which is connected to the base station, to the respective autonomous mobile device.

It is in particular preferred that the base station is connected to the Internet and/or a local network by wire or wirelessly. In such a case, the base station can relay information between the Internet or any other source connected to the local network, and the autonomous mobile device. The base station may particularly be configured to autonomously retrieve information from the Internet. Which information is retrieved from the Internet may be defined when setting up the system by the operator. Further, the local network to which the base station is connected may also be connected to an operator's terminal, that runs an application enabling the operator to either send commands, provide information to be transmitted by inputting the same, or inputting values for parameters that are to be set within the autonomous mobile device. Especially for outdoor applications wireless connection between the base station and the Internet or the local network, or any other data source is preferred. Problems that arise from the use of connectors in a wired connection are thus avoided. It is to be noted, that using a base station as such a relay station for connecting the autonomous mobile device with the local network, the Internet or other data sources has the great advantage that the base station is stationary. Consequently, when choosing the specific position where the base station shall be located, stability of the connection data source can be considered.

According to another aspect, the base station and/or the autonomous mobile device (or some, or all of the plurality of mobile devices) is configured to encrypt and/or sign the transmitted information, which means the provided data or commands. Encrypting this information has the advantage that security of the entire system is improved. Obviously, information encoded into the radio signal may be received by other, not authorized persons as well. When such information is transmitted in order to program operating times which are changed in case of the absence of the operator, this could indicate times, where the operator is on vacation or the like. Thus, encrypting the data which is transmitted from the base station to the autonomous mobile device significantly increases safety.

Preferred commands that can be encoded by the base station, transmitted to the autonomous mobile device(s), decoded and executed by the autonomous mobile device(s) comprise at least one of the following: return to base station, stop mowing, stop moving, move to coordinate XY, move to zone A, move to Wi-Fi range of house network, adjust mowing height. "Coordinate XY" may be any point of interest like for example a location in a garden that is preferred to be used for cleaning the autonomous mobile device because this location provides a water supply. "Zone A" may be any pre-defined part of the working area. "Move to Wi-Fi range of house network" may either cause the autonomous mobile device to move to an area that was pre-programmed during setup of the system and that is known to be covered by the house network, or it may cause the autonomous mobile device to move around within the work area and search for the house network and to stop when a connection to the house network can be successfully established. All the preferred commands have the advantage that comfort for the operator and/or safety in general can be increased by instructing the autonomous mobile device from a remote position.

Preferred data that is encoded by the base station comprises information on at least one of: working times, navigation points, weather information, device configuration, work parameters, map data, software update. Thus, configuration, operation and maintenance can be realized in a very convenient way because the operator may change set up of the system or at least of an individual autonomous mobile device from a remote location. Some of the data may also be generated or obtained automatically and its automated transmission to the autonomous mobile device helps to optimize operation of the device or even to avoid operation under conditions that may cause damage of the device. Using information from a weather forecast for example may help to schedule operation of the autonomous mobile device such that it is returned to the base station before heavy rain comes.

BRIEF DESCRIPTION OF THE DRAWINGS

The system including an autonomous lawnmower as an example for an autonomous mobile device and a base station connected to a boundary wire as well as its operation will now be explained based on the annexed drawings. In the drawings

DETAILED DESCRIPTION

Figure 1:
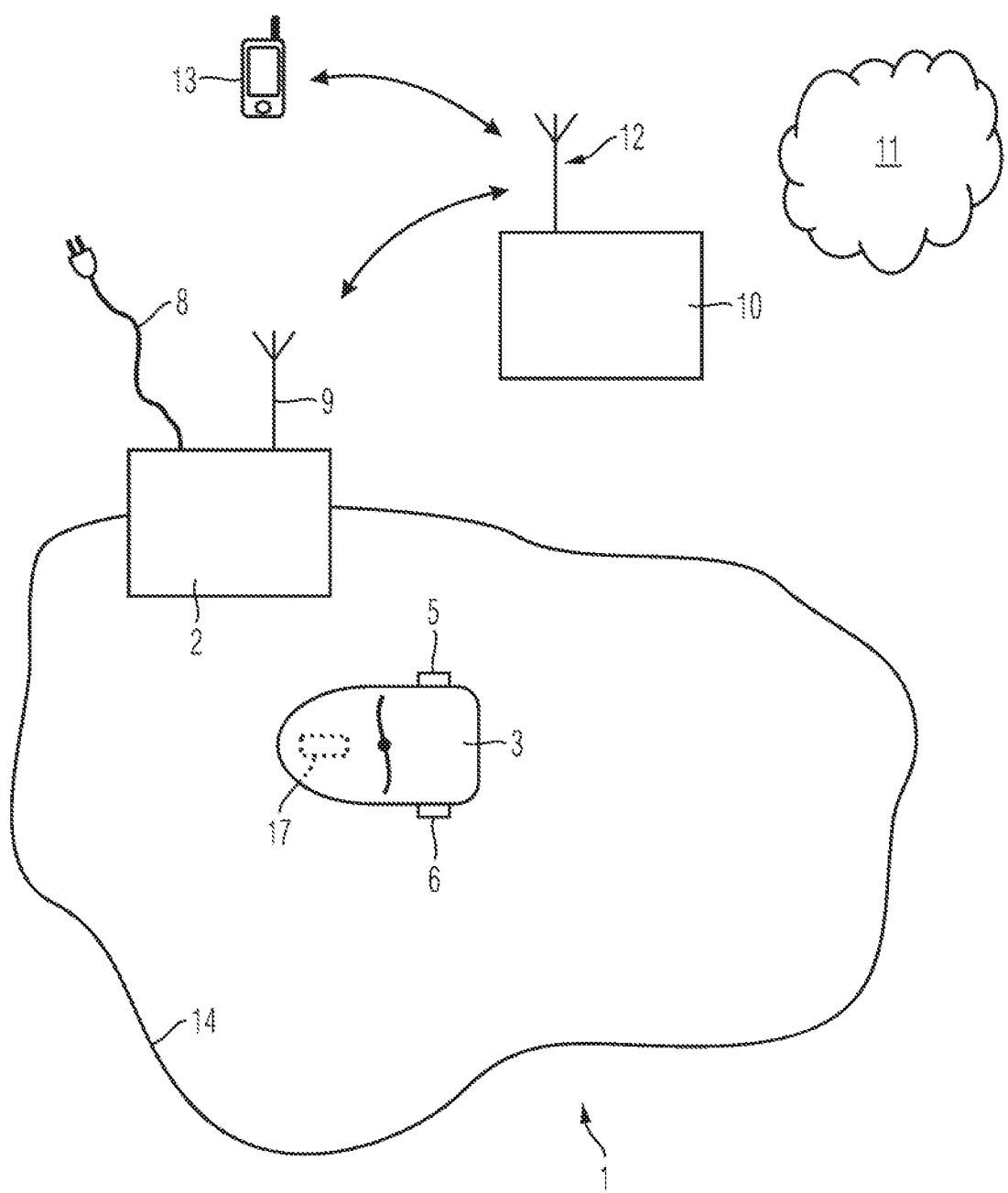
FIG. 1 shows the overall setup of the entire system.

According to a preferred embodiment of the present invention, the components of the invention will now be described with reference to an autonomous lawnmower as an autonomous mobile device. The inventive system 1 comprises a base station 2 and the autonomous lawnmower 3. The autonomous lawnmower 3 is driven using at least a pair of driven wheels 5, 6 and a freely rotating wheel. Typically each of the two driven wheels 5, 6 is driven by an electric motor (not shown in the drawing) and the direction of the autonomous lawnmower 3 is controlled by generating speed differences between the wheels 5, 6. Further, only schematically shown in the figure, the autonomous lawnmower comprises a blade 7 as a working tool. The autonomous lawnmower 3 comprises a rechargeable battery (not shown in the drawing) as a power supply for the electric motors of the wheels 5, 6 but also of the motor driving the blade 7. Further components will be described later on with reference to FIG. 3, in which a block diagram of the further components of the autonomous lawnmower 3, in particular with respect to the communication with the base station, are illustrated. In order to avoid any unnecessary explanations, and since the basic function of an autonomous mobile device is generally known, the further explanations are limited to aspects that are relevant for the present invention.

As shown in FIG. 1, the autonomous lawnmower 3 operates with in an area, the so-called working area, which is surrounded by a boundary wire 14. The boundary wire 14 is connected to the base station 2, which generates a radio signal that is emitted using the boundary wire 14. Thus, the boundary wire 14 which surrounds the work area of the autonomous lawnmower 3 emits an electromagnetic signal that can be sensed by the autonomous lawnmower 3.

The base station 2 is connected to a power grid using a power cord 8. Additionally, in the illustrated embodiment, the base station 2 comprises an antenna 9 for communicating with an access point 10 which also has an antenna 12. It is to be noted, that for explanation of the function of the present invention, it is always referred to an access point 10 being connected to the Internet 11 but also being part of a local network. Of course, other data sources might also be thought of.

The illustrated embodiment uses a wireless connection between the base station 2 and the access point 10. The access point 10 is connected to the internet 11 but also to an operator's terminal using the local network, for example a smart phone 13. Since the base station 2 is connected to the access point 10 either by the shown wireless connection or by a wired connection, any kind of data may be exchanged between the base station 2 and the internet or the smart phone 13. It is to be noted, that obviously instead of the smart phone also a computer, a tablet computer, a laptop, a remote control or the like may be used in order to send commands or provide information that shall be transferred to the base station 2. The communication of the base station 2 with the local network or the internet 11 may in particular be realized over power line, i.e. via the power cord 8.

According to the invention, the base station 2 is configured to encode information (data or commands), which is received via antenna 9 into the radio signal which is generated by the base station 2 anyway. In order to encode the information to be transmitted into the radio signal, the radio signal is used as a carrier signal and is modulated accordingly. The boundary wire 14 then emits the modulated radio signal and thus transfers the desired information to the autonomous lawnmower 3. In turn, the autonomous lawnmower 3 is configured to retrieve the information from the received encoded signal by decoding the information for further processing. In the present description the term "information" is generally used whenever data or commands are exchanged between the base station 2 the autonomous lawnmower 3. Only when necessary for a precise understanding, it will be referred to either data or commands explicitly.

In the illustrated system 1, only a single autonomous mobile device, namely the autonomous lawnmower 3, is shown. However, it is possible to use a plurality of such autonomous mobile devices and in case that a back channel is established for communication between the autonomous mobile device and the base station 2, it is also possible that one of the autonomous mobile devices using the back channel for transmitting information to the base station 2 acts as the source of information for the rest of the autonomous mobile devices which receive this information then from the base station 2.

One great advantage of the present invention is that the information to be transmitted to any one of the autonomous mobile devices is obtained by the base station 2 in first place. Retrieving and processing information which shall be provided to the autonomous mobile devices increases the energy consumption of the base station 2. However, the base station 2 is connected to the power grid and thus an increased energy consumption of the base station 2 has no negative effects on the maximum operation time of the autonomous lawnmower 3. On the other side, if direct communication of the autonomous mobile device and the Internet would be thought of, the increased power consumption would need to be compensated by increasing the capacity of the rechargeable battery. This would of course also leads to an increase in charging time or reduction in operation time. Apart from that, providing information via the base station 2 dispenses with the need of mounting communication means on every autonomous mobile device, when a plurality of autonomous mobile devices is operated in the same working area. They all can share the same information provider, namely the base station 2.

Of course, the base station 2 needs to be positioned such that the boundary wire 14 which needs to be buried around the working area can be connected to the base station. But apart from that, the position of the base station 2 can be chosen freely. Consequently, it is easily possible to find a position of the base station where a stable connection with the access point 10 is ensured. But also in case that a wired connection between the base station 2 and the access point 10 is used, the position may be chosen such that a short cable length for the wired connection is achieved.

Figure 2:
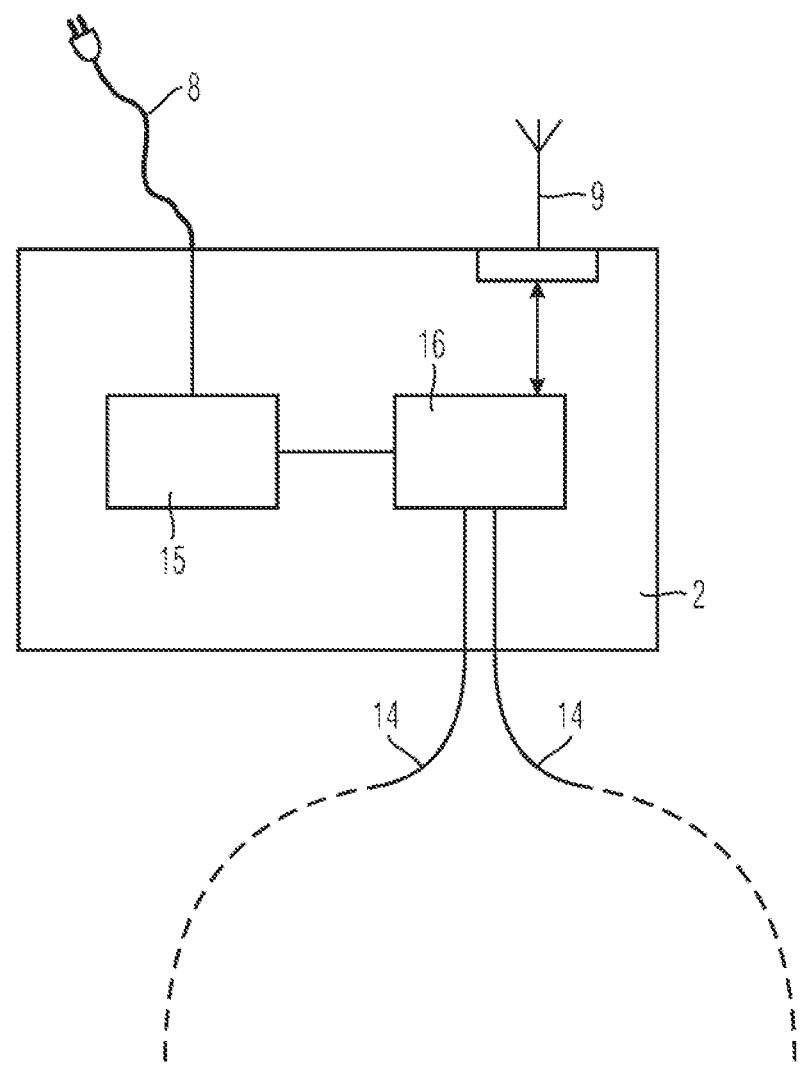
FIG. 2 shows a block diagram of a base station of the inventive system.

A block diagram of a base station 2 according to the inventive system 1 will now be described with reference to FIG. 2. The base station 2 is connected to a power grid using a power cord 8. The power cord 8 is connected to a signal generator 15 which generates a radio signal as it is known from currently available systems. The signal generator 15 is connected to a modulator/demodulator unit 16. In case that a unidirectional system for transmitting information only from the base station 2 to the autonomous lawnmower 3 shall be realized, of course, only a modulator is necessary. However, the following description describes a system 1 where a bidirectional communication between the base station 2 and the autonomous lawnmower 3 is possible.

Since generally modulating a radio signal with data corresponding to information that shall be transmitted to another entity is well known in the art, the components for modulating the radio signal generated in the generator 15 by the modulator/demodulator unit 16 are not explained or shown in detail. In particular, any preprocessing of the data that is necessary is not explicitly mentioned and is assumed to be executed also in the modulator/demodulator unit 16.

The modulated/demodulator unit 16 is connected via an interface with an antenna 9 in order to receive information from the Internet 11 via its connection to the access point 10 which is also equipped with an antenna 12. Based on the data thus obtained, the radio signal is modulated and the modulated signal is output to the boundary wire 14. The boundary wire 14 will therefore emit an electromagnetic signal including the information that is encoded into the radio signal by modulating the radio signal.

In order to achieve a stable and reliable data and command transmission from the base station 2 to the autonomous lawnmower 3 (and vice versa), the radio signal may be adapted to the length of the boundary wire 14. Such adaptation may concern the transmission power as well as radio signal frequency. In particular, the transmission power is adjusted such that the working area which is surrounded by the boundary wire 14 does not have any parts where the signal strength falls below a value that enables the autonomous lawnmower 3 to detect and demodulator the signal. In such a case it is possible to receive information encoded into the radio signal at any point of the working area.

Of course, there may be limitations for further increasing the power when the working area becomes too large. In such a case, it might be considered that the modulator/demodulator unit 16 at regular time intervals repeats the information by again modulating the radio signal with the information to be transmitted. When the autonomous lawnmower 3 then approaches the boundary wire 14 the information will be transmitted to the autonomous lawnmower 3. In case a bidirectional communication is established between the base station 2 and the autonomous lawnmower 3, successful reception of the repeated information may be confirmed by the autonomous lawnmower 3. Further repetition of the information then becomes unnecessary and can be stopped by the base station 2.

As mentioned above, information transmission is achieved by using a radiofrequency signal generated in the base station 2, where the actual information is modulated into the carrier frequency of the radiofrequency signal by the modulator/demodulator unit 16. The modulation may be phase modulation, amplitude modulation, or a combination thereof such as for example quadrature amplitude modulation. The carrier frequency of the radio signal may be adapted to the length of the boundary wire 14, because the boundary wire 14 acts as an antenna for transmitting the modulated radiofrequency signal. Such adaptation allows an optimized transmission and bandwidth.

The base station 2 may be connected to any type of external services, for example web-based weather forecast services, cloud services, smart home systems, networks like the operator's home network, Internet and/or devices like the operators smart phone, dedicated weather stations, DCF 77 time receiver or the like. The connection, which is realized as a wireless connection between the base station 2 and the access point 10 in the illustrated embodiment, may also be LTE, UMTS, GSM, Bluetooth, Zigbee, home automation networks like EEBus or KNX or known serial buses (RS232, RS485, One Wire, SPI, I2C) or the like. As mentioned above, the connection between the base station 2 and the access point 10 may be an Ethernet connection or a power line connection.

Figure 3:
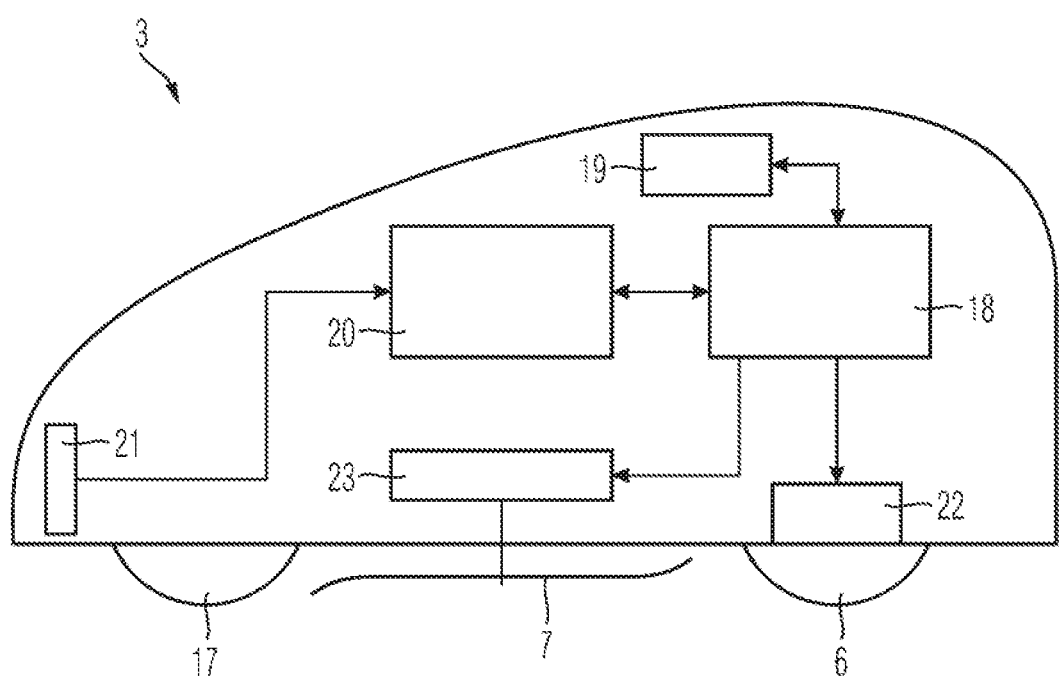
FIG. 3 shows a block diagram of the autonomous mobile device of the inventive system.

The modulated radio signal which includes the information to be transmitted to the autonomous lawnmower 3 is received by the autonomous lawnmower 3, a block diagram of which is shown in FIG. 3. The autonomous lawnmower 3 comprises a central processing unit for example microprocessor 18. The microprocessor 18 generates control signals in order to control operation of an electric motor 22, which drives wheel 6. A second motor, not shown in the drawing, drives the other drives wheel 5 and is also connected to the microprocessor 18 in order to receive control signals. Microprocessor 18 is furthermore connected to a memory 19, where parameters for operation of the autonomous lawnmower 3 are stored as well as programs for operating the autonomous lawnmower 3. The microprocessor 18 may retrieve data from memory 19 and store data in memory 19, for example parameters that are derived based on received information.

The microprocessor 18 is furthermore connected to a modulator/demodulator unit 20 which receives the signal sensed by sensor 21. The sensor 21 is dedicated to sense the electromagnetic field as emitted by the boundary wire 14 and which includes the information that is to be transmitted to the autonomous lawnmower 3. Further the modulator/demodulator unit 20 processes the received signal in order to retrieve the original information that is included in the received radio signal. This information is then forwarded to the microprocessor 18, where either parameters to be set are derived from the obtained information or control signals are generated from received commands.

The microprocessor 18 is furthermore connected to another electric motor 23 which drives the blade 7 for mowing the lawn. For reasons of conciseness, not all the mechanical components that are mounted in the autonomous lawnmower 3 are illustrated in the drawing. However, it is known in the art that the height of the blade 7 may be adjusted and that actuators are included in the autonomous lawnmower 3 that can be controlled by control signals generated by the microcontroller 18 as well. Finally, the autonomous lawnmower 3 comprises a freely rotating wheel 17.

When the antenna 21 (or sensor) receives the modulated radio signal from the boundary wire 14, the respective signal is forwarded to the modulator/demodulator unit 20. In the modulator/demodulator unit 20 the original information is retrieved by decoding the modulated signal and the obtained information is transferred to the microprocessor 18.

When on the other side information shall be transferred back from the autonomous lawnmower 3 to the base station 2, the radio signal on the boundary wire 14 is altered by the autonomous lawnmower 3 such that the base station 2, to be more precise the modulator/demodulator unit 16 of the base station can sense the alteration of the radio signal on the boundary wire 14. The alteration of the radio signal on the boundary wire 14 is achieved with the technique similar to the technique used in passive RFID transponders. The information based on which the alteration of the radio signal on the boundary wire 14 shall be performed, is provided by the microprocessor 18 and may be any kind of actual status of operation, service requirements, sensor outputs or the like The information that is transmitted from the base station 2 to the autonomous lawnmower 3 can be a command which is intended to directly influence the behavior and operation of the autonomous lawnmower 3. On the other side, such information may include data which is suitable to set parameter's which influence the autonomous lawnmower's future operation.

The data may be transmitted from the base station 2 the autonomous lawnmower 3 and vice versa using certain protocols. The organization of those additional protocols might or might not adhere to the OSI layer model. Protocols that do not necessarily require a back channel are particularly interesting, because in that case is not necessary that the autonomous device comprises a transmitter as well. Of course, in that case the entire system may provide limited functionality when compared to a bidirectional system.

Several different categories of information may be used. These categories are not limited but may comprise for example supplementary information, environmental information, schedule information, user interaction information, parameterizations or telemetric information. All information could potentially be received or sent by the autonomous mobile device from or to the base station 2 that is connected to external services, the Internet, networks or other devices. In the following, some examples for understanding different types of information that belongs to a certain category shall be given:

Supplementary information is information required by the transmission protocol such as for example sender and/or receiver ID, transmission sequence number, check sum of the transmission (e.g. CRC 32) or a hash value (e.g. MD 5, SHA 1, SHA 256). In case that the autonomous lawnmower 3 can be relocated, supplementary information could additionally contain location identification information.

Environmental information could be for example the current weather condition (e.g. humidity, temperature, sun radiation, air pressure or similar) or weather forecast (e.g. temperature, rain, precipitation probability and rate, time of sunrise and sunset, humidity, air pressure, sun radiation, weather condition such as cloudy, sunny, etc.). This method information can be used to decide on watering plants, mowing the lawn, cutting plants and similar for example. Additionally, the layout of the working area (e.g. a polygonal representation of a garden or golf course), obstacles in the working area (e.g. type, position, form as polygon or circuit, motion information) or target information (e.g. position of objects to collect, position and type of plants) might be transmitted. Another possible information is the autonomous mobile device's position along the boundary wire 14 that might allow the localization of the robot.

Schedule information might comprise working and non-working hours as well is time-dependent starting position.

User interaction information might include user commands (e.g. return to base station, drive to a certain position, stop or interrupt work) to account for special events (e.g. garden party, children playing in the garden), preferred start points for the work (e.g. where to start mowing where which plants to water first), triggering of work modii (e.g. silent slow mowing vs. normal fast mowing, cutting/no cutting of plants, etc.) or customized work targets (e.g. locations for putting the golf balls, etc.). Furthermore, the user might request information about the robot (e.g. battery status, position, operation status, where completion status) or the environment (e.g. weather condition, grow status of the plants). Additionally, the mobile robot might send information about e.g. detected intruders, detected animals or call for assistance in case of e.g. empty battery or blocked operation or just the current position.

Transmitted parameterizations might comprise customized operation patterns (e.g. operation time, operation area, parameterization of mowing motion, preferred motion pattern, operation duration, speed, lawn cutting height, amount of required water for plans) based on e.g. the garden layout, plant types etc., position correction information such as GPS noise or correction information (e.g. determined by differential GPS or RTK-GPS), optimal starting position or optimal driving path or time synchronization information (e.g. using network time protocol NTP or simple network time protocol SNTP). All this information might be optimized by an external service with higher computing power based on information collected by the mobile robot (e.g. the working area layout).

The communication channel via the boundary wire 14 might also be used by multiple mobile devices in order to organize the operation on the shared working area. For example, the different mobile devices could negotiate a separation of the work zones into exclusive subzones where the autonomous mobile devices could agree on a schedule for charging in the base station 2 as this might be an exclusive resource. Other possibilities would be the communication between different kinds of autonomous mobile devices. For example, a watering robot might detect a strong need for watering and thus, signal an autonomous lawnmower 3 to suspend until the watering has been done. It is also possible, but not necessary, that the base station 2 acts as a kind of information hub which aggregates the information from the autonomous mobile devices.

Telemetric information might include the current battery status, the operation status (e.g. mowing, charging, returning to base station, a failure), distance driven, current position, operating time, remaining water, fertilizer or similar.

The transmitted information as well as the overall digital protocol might be encrypted and/or signed by the sender to ensure secrecy, privacy and authenticity of the transmitted data. Here, either symmetric Cryptographic methods (e.g. AES, DES, IDEA, Blowfish, Twofish) or asymmetric cryptographic methods (e.g. RSA, Diffie-Hellman and variants, ElGamal, Elliptic curve techniques) or combinations thereof may be used.

The invention claimed is:

1. A system comprising a plurality of autonomous mobile devices and a base station connected to a boundary wire and configured to generate a radio signal to be emitted by the boundary wire,
    wherein each of the plurality of autonomous mobile devices is configured to autonomously drive within a working area based on the signal emitted by the boundary wire,
    wherein the base station is configured to encode data or commands into the radio signal and each of the plurality of autonomous mobile devices is configured to decode the encoded data or commands,
    wherein each of the plurality of autonomous mobile devices is configured to inject a signal into the boundary wire for establishing a communication back channel to communicate with each other, and
    wherein each of the plurality of autonomous mobile devices is configured to, based on the command received from the base station, move around within the working area and search for a Wi-Fi house network and to stop moving when a connection to the Wi-Fi house network can be successfully established.

2. The system according to claim 1, wherein
a frequency of the radio signal on the boundary wire is adapted to a length of the boundary wire.

3. The system according to claim 1, wherein
transmission power output of the radio signal is adapted according to a maximal receiving distance of the autonomous mobile device or according to a predetermined limitation concerning allowed signal power.

4. The system according to claim 1, wherein
the autonomous mobile device is configured to directly convert decoded commands into control commands for controlling at least one of a driving direction, driving speed and operation of a working tool of the autonomous mobile device.

5. The system according to claim 1, wherein
the autonomous mobile device is configured to set parameters for future operation of the autonomous mobile device based on data encoded by the base station and decoded by the autonomous mobile device.

6. The system according to claim 1, wherein
the autonomous mobile device is a lawnmower, vacuum cleaner, garden robot or a storage robot.

7. The system according to claim 1, wherein
a communication protocol used implements at least one of a checksum, a hash value, a sender ID, a receiver ID or data packet length.

8. The system according to claim 7, wherein
the communication protocol is User Datagram Protocol (UDP), Trivial File Transfer Protocol (TFTP) or Broadcast Trivial File Transfer Protocol (BTFTP), Saratoga Protocol or Licklider Transmission Protocol (LTP).

9. The system according to claim 1, wherein
the system is configured to determine operating times or working areas for at least two autonomous mobile devices of the plurality of autonomous mobile devices.

10. The system according to claim 1, wherein
each of the autonomous mobile devices is associated a unique address.

11. The system according to claim 1, wherein
the base station is connected to the internet or local network by wire or wirelessly and relays information between internet or local network and the autonomous mobile device(s) or between a user terminal connected to the local network and the autonomous mobile device(s).

12. The system according to claim 1, wherein
the base station or autonomous mobile device(s) is/are configured to encrypt or sign transmitted data or command using a cryptographic algorithm.

13. The system according to claim 1, wherein
commands that can be encoded by the base station and decoded and executed by the autonomous mobile device comprise at least one of the following: return to base station, stop mowing, stop moving, move to coordinate XY, move to zone A, move to Wi-Fi range of house network, adjust mowing height.

14. The system according to claim 1, wherein
the data that is encoded by the base station comprises information on at least one of: working times, navigation points, weather information, device configuration, work parameters, map data, software update.

* * * * *